Aug. 12, 1969
J. L. WENTZ
POLARIZATION INDEPENDENT PHASE SHIFTER FOR OPTICAL FREQUENCIES
Filed May 24, 1966
3,460,885
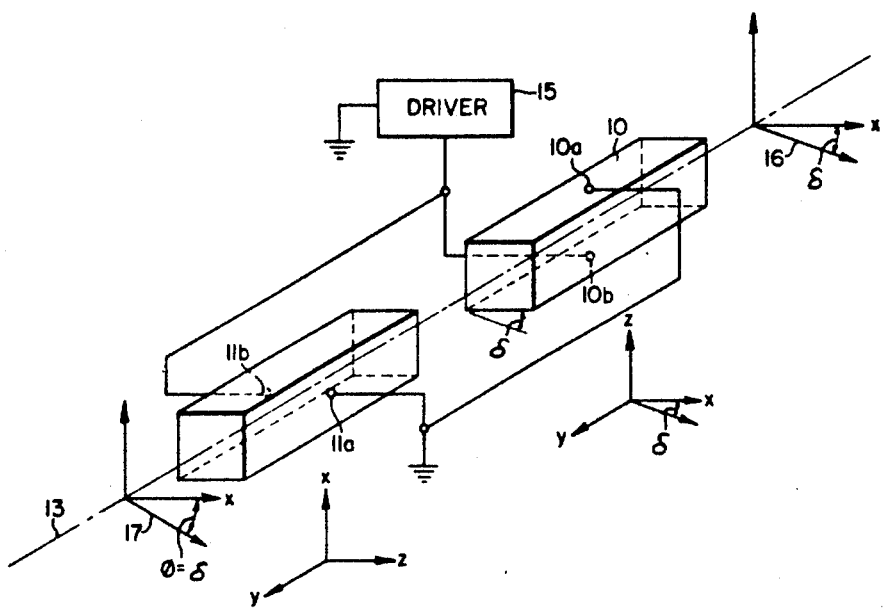
WITNESSES
Theodore F. Wrobel
Leon M. Garman
INVENTOR
John L. Wentz
BY
ATTORNEY > United States Patent Office 3,460,885
Patented Aug. 12, 1969

3,460,885
POLARIZATION INDEPENDENT PHASE SHIFTER FOR OPTICAL FREQUENCIES
John L. Wentz, Randallstown, Md., assignor to Westinghouse Electric Corporation, Pittsburgh, Pa., a corporation of Pennsylvania
Filed May 24, 1966, Ser. No. 552,448
Int. Cl. G02f 1/16
U.S. Cl. 350—160                                             1 Claim

ABSTRACT OF THE DISCLOSURE

An electrooptical optical phase shifting system, operating independently of the polarization of the incident light, comprising a pair of electrooptical crystals exhibiting the Pockel's effect arranged their respective optic axes perpendicular to each other and to the optical axis determined by the colinear alignment of one of each of the principal axes of the crystals, in which modulating voltages are applied along the optic axes with the relative polarities being such as to cause the phase shift of the light components orthogonal to the respective optic axes to change in the same direction in response to voltage changes in the same direction

---

This invention relates to means for electronically shifting the phase of a coherent light beam independently of the polarization of the beam.

Devices are known for electronically shifting the phase of light, but such devices are capable only of shifting the phase of polarized light. The advent of the development of amplifiers operating on the principle of stimulated emission of radiation has stimulated great effort in the art to develop devices for controlling and modulating coherent light beams. Phase modulation or phase shifting for the purpose of modulating or varying the output of such amplifiers heretofore have been limited to those devices which would operate with discrete linear polarizations of the incident light beam.

Applicant's copending application, Ser. No. 343,319, filed Feb. 7, 1964 for Electrooptical Light Modulation Means, describes and claims an electrooptical light modulation means which, in effect, is a very fast acting light valve for linearly polarized light. In that application there is described a device quite similar to the present invention which can be inserted into the Fabry-Perot cavity of a stimulated emission radiation device for modulating the output thereof if the light is polarized.

It is an object of the present invention to provide a phase shifter for optical frequencies which is capable of operating on unpolarized light.

Another object is to provide a novel and improved phase shifter for optical frequencies utilizing electrooptic material exhibiting the Pockels effect.

The invention itself, however, both as to its organization and method of operation, as well as additional objects and advantages, will be best understood from the following description when read in connection with the accompanying drawing, in which:

The single figure of the drawing is a schematic illustration of the present invention.

Briefly, the present invention provides an improved electrooptical light modulating means, capable of operating independently of the polarization of the light, comprising a pair of suitable electrooptical crystals exhibiting the Pockels effect positioned in the light path and suitable means for applying electric fields to the crystals transverse to the light path and along the respective Z-axes of the crystals. The phase shifting arrangement of the present invention is similar in physical arrangement to that shown in the aforementioned patent application, but produces a distinctly different result by reason of a different particular manner in which the electric voltages are applied relative to the two electrooptical crystals.

To facilitate an understanding of the present invention and to make readily apparent the distinction between the present invention and the subject matter of the aforementioned application, the following preliminary theoretical and environmental discussion will be helpful.

The phase of a linearly polarized coherent light beam can be controlled by directing the beam along a particular axis in an electrooptical material exhibiting the Pockels effect. The Pockels effect is a result of changes in a refractive index brought about by application of electric fields in certain transparent crystals, such as crystals of potassium dihydrogen phosphate, (KDP) and ammonia dihydrogen phosphate (ADP). These crystals are uniaxial and possess one optic axis when not subject to an electric field. However, when an electric field is applied, these crystals become biaxial.

The Pockels effect (or linear electrooptic effect) is best described with reference to the Fresnel index ellipsoid. This ellipsoid has axes proportional to the three principal indices of refraction in the optically anisotropic medium. In general, $$\frac{x^2}{N^2_x} + \frac{y^2}{N^2_y} + \frac{z^2}{N^2_z} = 1 \quad (1)$$

where $x$, $y$ and $z$ are the axes of the index ellipsoid and $N_x$, $N_y$ and $N_z$ are the principal indices of refraction for light vibrating parallel to the $x$, $y$ and $z$ axes, respectively. In crystals exhibiting the Pockels effect the ellipsoid described by Equation 1 is altered by subjecting the crystal to an electric field. The degree to which the ellipsoid is altered can be determined by referencing the ellipsoid to the crystal axes. The ellipsoid equation expressed in matrix form reads $$[X, Y, Z] \times \begin{bmatrix} A_{11} & A_{12} & A_{13} \\ A_{21} & A_{22} & A_{23} \\ A_{31} & A_{32} & A_{33} \end{bmatrix} \times \begin{bmatrix} X \\ Y \\ Z \end{bmatrix} = 1 \quad (2)$$

where X, Y and Z are the crystallographic axes and the $A_{ij}$ are the polarization constants. By symmetry $A_{ij}=A_{ji}$ for $i \neq j$. When an electric field is applied to the crystal $A_{ij}$ are given by $$\begin{bmatrix} A_{11} - A^0_{11} \\ A_{22} - A^0_{22} \\ A_{33} - A^0_{33} \\ A_{23} - A^0_{23} \\ A_{31} - A^0_{31} \\ A_{12} - A^0_{12} \end{bmatrix} = \begin{bmatrix} r_{11} & r_{12} & r_{13} \\ r_{21} & r_{22} & r_{23} \\ r_{31} & r_{32} & r_{33} \\ r_{41} & r_{42} & r_{43} \\ r_{51} & r_{52} & r_{53} \\ r_{61} & r_{62} & r_{63} \end{bmatrix} \times \begin{bmatrix} E_X \\ E_Y \\ E_Z \end{bmatrix} \quad (3)$$

where $A^0_{ij}$ is the zero field value of the polarization constant, $r_{mn}$ are the electrooptic constants, and $E_X$, $E_Y$ and $E_Z$ are the components of the applied electric field parallel to the X, Y and Z crystallographic axes, respectively. In order to determine the orientation of the index ellipsoid given in Equation 1 it is deemed necessary to determine the $A_{ij}$ and perform a principal axis transformation on the ellipsoid of Equation 2. The evaluation of the $A_{ij}$ is accomplished by investigating the symmetry properties of the electrooptic crystal in question.

Electrooptic crystals exhibiting the linear electrooptic effect and belonging to the uniaxial class are characterized by having $N_x=N_y=N_o \neq N_z$ in equation 1. This also implies that $$A^0_{11} = A^0_{22} = \frac{1}{N^2_o}, \quad A^0_{33} = \frac{1}{N^2_z}$$

and $$A^0_{23} = A^0_{31} = A^0_{12} = 0$$ in Equation 3 since the latter must reduce the Equation 1 when no field is applied. By virtue of the symmetry present in such crystals, as described in the article by B. H. Billings, "The Electro-optic Effect in Uniaxial Crystals of the Type KH$_2$PO$_4$," I., Theoretical. J. OPT. Soc. AM. vol. 39, No. 10, pp. 797–801, October 1949, the $r$ matrix in Equation 3 has the form $$[r] = \begin{bmatrix} 0 & 0 & 0 \\ 0 & 0 & 0 \\ 0 & 0 & 0 \\ r_{41} & 0 & 0 \\ 0 & r_{41} & 0 \\ 0 & 0 & r_{63} \end{bmatrix} \quad (4)$$

which when substituted into Equation 3 yields the values $$A_{11} = \frac{1}{N_0^2} \quad A_{22} = \frac{1}{N_0^2} \quad A_{33} = \frac{1}{N_z^2}$$

$$A_{23} = r_{41}E_X \quad A_{31} = r_{41}E_Y \quad A_{12} = r_{63}E_Z \quad (5)$$

Of particular interest, with regard to uniaxial electrooptic crystals, is the electrooptic effect resulting from an electric field parallel to the Z axis. This implies that $E_X = E_Y = 0$ and that $A_{ij}$ matrix given in Equation 2 is expressed as $$[A_{ij}] = \begin{bmatrix} \frac{1}{N_0^2} & r_{63}E_Z & 0 \\ r_{63}E_Z & \frac{1}{N_0^2} & 0 \\ 0 & 0 & \frac{1}{N_z^2} \end{bmatrix} \quad (6)$$

after substituting the values given in 5 into the matrix. The orientation of the index ellipsoid given by Equation 1 with field applied is found by performing a principal axis transformation on the equation of the index ellipsoid given in Equation 2. This is accomplished by converting the matrix 6 into a diagonal form. In view of this operation, it is necessary to solve for the roots $\lambda$ of the following $A_{ij}$ matrix.

$$\begin{bmatrix} \frac{1}{N_0^2} - \lambda & r_{63}E_z & 0 \\ r_{63}E_Z & \frac{1}{N_0^2} - \lambda & 0 \\ 0 & 0 & \frac{1}{N_z^2} - \lambda \end{bmatrix} = 0 \quad (7)$$

These roots are the elements of the diagonal matrix. Matrix 7 yields a cubic equation with roots $$\lambda_1 = \frac{1}{N_0^2} - r_{63}E_Z = \frac{1}{N_x^2}$$

$$\lambda_2 = \frac{1}{N_0^2} + r_{63}E_Z = \frac{1}{N_y^2}$$

$$\lambda_3 = \frac{1}{N_z^2} \quad (8)$$

where the $\lambda$'s are the reciprocal indices squared of the index ellipsoid Equation 1 when an electric field is applied along the u axis. The orientation of the ellipsoid with respect to the crystallographic axes is found as follows: From Equation 8 the expression for $\lambda_3$ indicates that the crystallographic axis Z and the index ellipsoid axis z coincide. Therefore, it can be stated that with an electric field applied to the z axis the index ellipsoid rotates about the coincident Z and z axes which implies that the rotation occurs only in the XY plane. The coordinate transformation is then given in matrix form by $$\begin{bmatrix} x \\ y \end{bmatrix} = \begin{bmatrix} -\cos\theta & \sin\theta \\ -\sin\theta & \cos\theta \end{bmatrix} \times \begin{bmatrix} X \\ Y \end{bmatrix} \quad (9)$$

where the angle $\theta$ is the angle of rotation. The angle $\theta$ is found by substituting the expressions for $x$ and $y$ given in Equation 9 as functions of $\theta$, $X$ and $Y$ into the ellipsoid Equation 1 and equating the terms involving products of $X$ and $Y$ to zero. If this is carried out it is found that $\theta = \pm 45°$, independently of the magnitude of the applied field.

The values for $N_x$ and $N_y$, given in Equation 8, can be simplified as follows:

$$\frac{1}{N_x^2} = \frac{1}{N_0^2} - r_{63}E_Z$$

$$\frac{1}{N_y^2} = \frac{1}{N_0^2} + r_{63}E_Z \quad (10)$$

$$N_x^2 = N_0(1 - N_0^2 r_{63}E_z)^{-\frac{1}{2}}$$

$$N_y^2 = N_0(1 + N_0^2 r_{63}E_z)^{-\frac{1}{2}} \quad (11)$$

Since the term $(N_0^2 r_{63}E_z)$ will be much less than unity, the binominal expansion of $N_x$ yields $$N_x = N_0 + \Delta N = N_0\left(1 + \frac{N_0^2 r_{63}E_z}{2}\right) = N_0 + \left(\frac{N_0^3 r_{63}E_z}{2}\right) \quad (12)$$

Similarly $$N_y = N_0 - \Delta N = N_0\left(1 - \frac{N_0^2 r_{63}E_z}{2}\right) = N_0 - \left(\frac{N_0^3 r_{63}E_z}{2}\right) \quad (13)$$

An electric field applied parallel to the z axis in the positive z axis direction will cause $N_x$ to increase and $N_y$ to decrease while $N_z$ remains unaltered. This may be represented as $$N_x = N_0 + \Delta N$$

and $$N_y = N_0 - \Delta N$$

where $\Delta N$ is a linear function of the applied field. For a crystal of thickness $d$ along the direction of the electric field $$\Delta N = \frac{N_0^3 r_{63}E_z}{2} = \frac{N_0 r_{63}V_z}{2d} \quad (16)$$

where $V_z$ is the applied voltage; $d$ is the crystal thickness; $r_{63}$ is the electrooptic coefficient; and, $E_z = V_z/d$ It is well known that the phase of a light beam emerging from an electrooptic medium is a function of the index of refraction, N, given by the relation $$\phi = \frac{2\pi LN}{\lambda} \quad (17)$$

where L is the length of the light path in the medium; $\lambda$ is the wavelength of the radiation; and $\phi$ is the phase change of the light wave.

By subjecting an electrooptic medium to an electric field along the z axis and passing polarized light through the medium parallel to one of the other axes, say $x$ axis, while being polarized parallel to the $y$ axis, (or vice versa) a change in phase can be achieved by virtue of the change in index of refraction. The amount of phase change as a function of the change of index of refraction can be expressed by $$\phi(N_0) = \frac{2\pi LN_0}{\lambda} \quad (18)$$

with no field applied and by $$\phi(N_0 + \Delta N) = \frac{2\pi L}{\lambda}(N_0 + \Delta N) \quad (19)$$

with field applied. Accordingly, the phase change due to the change in index of refraction becomes $$\Delta\phi = \phi(N_0 + \Delta N_0) = \frac{2\pi L \Delta N}{\lambda} \quad (20)$$

Substituting the value of $\Delta N$ from equation 16 into Equation 19 gives $$\Delta\phi = \frac{\pi L r_{63} V_z N_0^3}{\lambda d} \quad (21)$$

The phase shift indicated in Equation 20 is restricted to linear polarization of the incident light polarized parallel to either the X or Y principal optic axis in the electro-optic crystal. However, using the above principles in a two crystal system, phase shift can be produced for any incident polarization. There are many applications in which it is desired to change the optical phase shift of a randomly polarized light beam, particularly in heterodyne receivers for optical communication. In accordance with this invention the phase shift can be produced for any incident polarization. This is possible by reason of the relative orientation of the crystallographic axes and the relative polarity of the applied electric fields on the crystals as more fully explained later.

For an understanding of this, reference is now made to the single figure of the drawing which shows the orientation of the axes of the index ellipsoid for the crystals 10 and 11. As can be seen from the drawing the two crystals 10 and 11 are elongated and have a square cross-section. The longitudinal physical axes of the two crystals are colinear along the optical path 13, and in the illustrated embodiment of the index ellipsoid axes of the crystals. The axes in the drawing are the rotated axes of the index ellipsoid after an electric field has been applied to the Z axis. To apply an electric field to the crystals for the purpose of changing or effecting the phase shift a source of DC potential, such as a battery or a source of modulating voltage in the form of a driver 15 is provided to supply the controlling potential through terminals 10a and 10b on crystal 10 and terminals 11a and 11b on crystal 11. The terminals are adapted to supply an electric field perpendicular to the physical axis of the system; that is, the light path 13. As seen in the drawing the electric fields established in the crystals are along the z axes of the respective crystals which are perpendicular to each other. The polarity on the terminals; that is, the direction of the lines of electric force, are such as to cause the phase shift of the orthogonal components of the light to change in the same direction.

The manner in which the system operates is as follows: Assume an optical input of arbitrary polarization propagating from right to left along the optical path 13. This input light can be expressed as two orthogonal components, $E_1$ and $E_2$, vibrating parallel to the axes shown in the drawing.

It is to be noted that the crystals 10 and 11 are so oriented about the optical path 13 that the z axis of the index ellipsoid of crystal 10 is perpendicular to the z axis of the index ellipsoid of crystal 11. Accordingly, the incident orthogonal components may be expressed as:

$$E_1 = E_\alpha \cos(wt + \theta_1) \quad (22)$$

and $$E_2 = E_\beta \cos(wt + \theta_2) \quad (23)$$

where $E_\alpha$ and $E_\beta$ are the amplitudes of $E_1$ and $E_2$, respectively; $E_1$ is the component vibrating parallel to the x axis of crystal 10 and the z axis in crystal 11; $E_2$ is the component vibrating parallel to the z axis in crystal 10 and the x axis in crystal 11; $\theta$ is the phase of the component $E_1$; $\theta_2$ is the phase of component $E_2$; and $w$ is the angular frequency of the incident light.

The phase changes for the components $E_1$ and $E_2$, respectively, on emerging from the crystal 11 are $$\phi_1 = \frac{2\pi L}{\lambda}(N_x + N_z) \quad (24)$$

and $$\phi_2 = \frac{2\pi L}{\lambda}(N_z + N_x) \quad (25)$$

The emerging components then may then be expressed as $$E_1 = E_\alpha \cos(wt + \theta_1 + \phi_1) \quad (26)$$

and $$E_2 = E_\beta \cos(wt + \theta_2 + \phi_2) \quad (27)$$

An electric field applied simultaneously on the faces of the two crystals 10 and 11 parallel to their respective z axes will cause the index of refraction $N_x$ of both crystals to change while their index $N_z$ remains constant. The difference in phase shift between components $E_1$ and $E_2$ remains at zero since $\phi_1$ and $\phi_2$ are equal as shown by the following equation:

$$\phi_1 - \phi_2 = \frac{2\pi L}{\lambda}(N_x + N_z - N_z - N_x) = 0 \quad (28)$$

and $\phi_1 = \phi_2 = \phi$.

Since $\phi_1$ and $\phi_2$ will always be equal for the particular crystal and field configuration, no retardation is produced between orthogonal components. Therefore, the original polarization is preserved. However, when the orthogonal components emerge from the crystals, the resultant will be shifted in phase by an amount $\pm \phi$ when compared to the phase when no field is applied to the crystals.

As a specific example of the generalized case described above, consider a linearly polarized light wave incident upon the phase shifting system and represented by the polarization vector 16 making an angle $\delta$ with respect to the x axis of crystal 10. Then the amplitude of the incident light as a function of time will be $$E(t) = E \cos wt \quad (29)$$

and the two orthogonal components will be $$E_1 = E \sin \delta \cos wt \quad (30)$$

and $$E_2 = E \cos \delta \cos wt \quad (31)$$

The emerging light may be expressed by $$E_1 = E \sin \delta \cos(wt + \phi_1) \quad (32)$$

$$E_2 = E \cos \delta \cos(wt + \phi_2) \quad (33)$$

Since $\phi_1 = \phi_2 = \phi$, where $\phi$ is the phase shift angle between the incident light wave 16 and the emergent light wave represented by the vector 17, Equation 32 becomes $$E_1 = E \sin \delta \cos(wt + \phi) \quad (34)$$

and Equation 33 becomes $$E_2 = E \cos \delta \cos(wt + \phi) \quad (35)$$

The resultant emergent light is then $$E(t) = \sqrt{E_1^2 + E_2^2} = E \cos(wt + \phi) \quad (36)$$

and the original incident wave has been shifted in phase by $\phi$ radians.

I claim as my invention:

1. In combination in an optical phase shifting system first and second elongated birefringent electro-optical crystals having the same index of refraction arranged in light transmitting relationship with the respective optic axes of said crystals being effectively optically perpendicular to each other and to the optical axis determined by the colinear alignment of one of each of the principal axes of said crystals, said crystals having the same length along said optical axis and being subjected to the same external environmental conditions, means for supplying a modulation signal voltage to said crystals with the electric fields parallel to the respective optic axes of said crystals, the relative polarities applied to the respective crystals being such as to cause the phase shift of the components of the light orthogonal to the optic axes to change in the same direction in response to voltage changes in the same direction.

References Cited

UNITED STATES PATENTS

| 3,304,428 | 2/1967 | Peters | 250—199 |
|---|---|---|---|
| 3,325,646 | 7/1967 | Reichel | 260—199 |

RONALD L. WIBERT, Primary Examiner

P. K. GODWIN, Assistant Examiner

U.S. Cl. X.R.

250—199; 350—147, 157